(12) United States Patent
Ito

(10) Patent No.: US 12,401,529 B2
(45) Date of Patent: Aug. 26, 2025

(54) ELECTRONIC DEVICE AND INFORMATION PROCESSING SYSTEM

(71) Applicants: Sees Co., Ltd., Tokyo (JP); NAGASE & CO., LTD., Osaka (JP)

(72) Inventor: Hisao Ito, Tokyo (JP)

(73) Assignees: SEES CO., LTD., Tokyo (JP); NAGASE & CO., LTD., Osaka (JP)

( * ) Notice: Subject to any disclaimer, the term of this patent is extended or adjusted under 35 U.S.C. 154(b) by 117 days.

(21) Appl. No.: 17/606,336

(22) PCT Filed: Apr. 24, 2020

(86) PCT No.: PCT/JP2020/017632
§ 371 (c)(1),
(2) Date: Apr. 12, 2022

(87) PCT Pub. No.: WO2020/218478
PCT Pub. Date: Oct. 29, 2020

(65) Prior Publication Data
US 2024/0291677 A1    Aug. 29, 2024

(30) Foreign Application Priority Data

Apr. 26, 2019 (JP) .................... 2019-086276
Sep. 11, 2019 (JP) .................... 2019-165493

(51) Int. Cl.
*H04L 9/00* (2022.01)

(52) U.S. Cl.
CPC ..................... *H04L 9/50* (2022.05)

(58) Field of Classification Search
CPC ... H04L 1/00; H04L 9/50; G06F 11/00; G06F 11/07; B60W 2050/0215
See application file for complete search history.

(56) References Cited

U.S. PATENT DOCUMENTS 10,666,767 B1 * 5/2020 Floyd .................... H04L 9/3247
2017/0296056 A1 * 10/2017 Hresko ................ A61B 5/0015
(Continued)

FOREIGN PATENT DOCUMENTS

JP    2017026755 A    2/2017
KR    10-1946195 B1    2/2019
(Continued)

OTHER PUBLICATIONS

World Intellectual Property Organization, International Search Report for International Application No. PCT/JP2020/017632, Mail date Aug. 4, 2020, 4 total pages.

*Primary Examiner* — Simon P Kanaan
(74) *Attorney, Agent, or Firm* — SoCal IP Law Group LLP; Mark A. Goldstein

(57) ABSTRACT

Systems and methods for reducing the risk of data destruction during data transmission are described herein. Based on sensor information, a data block generation unit generates a data block BD1, a data block BD2, and a data block BD3. A first processing unit generates second association information and appends it to the data block BD2 as first association information HD2. A second processing unit generates second association information including at least a hash value obtained from the data block BD2, and appends it to the data block BD2. A storage control unit executes control to correlate the data block BD2, to which the first association information HD2 and the second association information FT2 have been appended, to at least one other unit of data, including the data block BD1, using blockchain technology, and to store the data in a storage unit.

10 Claims, 6 Drawing Sheets

(56) References Cited

U.S. PATENT DOCUMENTS

| | | | |
|---|---|---|---|
| 2018/0322160 A1 | 11/2018 | Horii et al. | |
| 2018/0342036 A1 | 11/2018 | Zachary | |
| 2019/0188086 A1 | 6/2019 | Maeda et al. | |
| 2019/0235946 A1 | 8/2019 | Guo et al. | |
| 2019/0236865 A1* | 8/2019 | Mercep | B60W 50/0205 |
| 2019/0295078 A1 | 9/2019 | Bae | |
| 2020/0174679 A1* | 6/2020 | Scott | G06F 3/0673 |
| 2020/0213126 A1* | 7/2020 | Schnabel | G07C 5/008 |

FOREIGN PATENT DOCUMENTS

| | | |
|---|---|---|
| WO | 2018177264 A1 | 10/2018 |
| WO | 2018203119 A1 | 11/2018 |
| WO | 2019008158 A1 | 1/2019 |
| WO | 2020218478 A1 | 10/2020 |

* cited by examiner

ELECTRONIC DEVICE AND INFORMATION PROCESSING SYSTEM

RELATED APPLICATION INFORMATION

This patent claims priority from International PCT Patent Application No. PCT/JP2020/017632, filed Apr. 24, 2020 entitled, "ELECTRONIC DEVICE AND INFORMATION PROCESSING SYSTEM", which claims priority to Japanese Patent Application No. 2019-086276, filed Apr. 26, 2019 and Japanese Application No. 2019-165493, filed Sep. 11, 2019 all of which are incorporated herein by reference in their entirety.

FIELD

The present invention relates to an electronic device and an information processing system.

BACKGROUND ART

Conventionally, it is important to take measures against the risks related to data destruction when transmitting and receiving information. In this regard, there is proposed a technology that reduces the risks of data destruction when transmitting information (for example, see Patent Document 1).
Patent Document 1: Japanese Unexamined Patent Application, Publication No. 2017-026755

SUMMARY

Problems to be Solved by the Invention

When building a system that transmits data from sensors via a communication line, for example, by using only the conventional technologies including Patent Document 1 mentioned above, it is common to centrally manage all output information from the sensors by a single or a small number of CPUs (Central Processing Units). In recent years, however, the number and kind of sensors are on an increasing trend, and the load of the CPUs managing the output information is increasing more and more. In the meantime, if it takes time to perform data validation check processing by the CPU when data garbling or the like occurs in the transmission data due to lightning, an electrostatic discharge phenomenon, electromagnetic noise or the like from other electronic devices, it is not possible to promptly respond thereto on the CPU side. Therefore, it is becoming more important to be able to immediately detect an anomaly of transmission data that causes malfunction of the system and also to instantly normalize the anomaly of the transmission data while reducing the load of the CPU.
The present invention is designed in view of such circumstances, and it is an object thereof to provide a technology capable of further reducing the risk of data destruction during data transmission.

Means for Solving the Problems

In order to achieve the foregoing object, an electronic device according to an aspect of the present invention includes:
- a generation unit that generates data in a prescribed unit based on prescribed information;
- a first processing unit that generates, with data of the unit as a processing target generated by the generation unit being first unit data and data of the unit generated prior to the first unit data by the generation unit being second unit data, information including at least a hash value acquired from the second unit data as first association information, and appends the first association information to the first unit data as the processing target;
- a second processing unit that generates information including at least a hash value acquired from the first unit data as second association information, and appends the second association information to the first unit data as the processing target; and
- a storage control unit that executes control for correlating the first unit data as the processing target, to which the first association information and the second association information are appended, with one or more other pieces of data of the unit including the second unit data by using a blockchain technology, and for storing the correlation in a prescribed storage medium.

Effects of the Invention

According to the present invention, it is possible to provide a technology capable of further reducing the risks of data destruction during data transmission.

DETAILED DESCRIPTION

Embodiments of the present invention will be described hereinafter with reference to the accompanying drawings.

Figure 1:
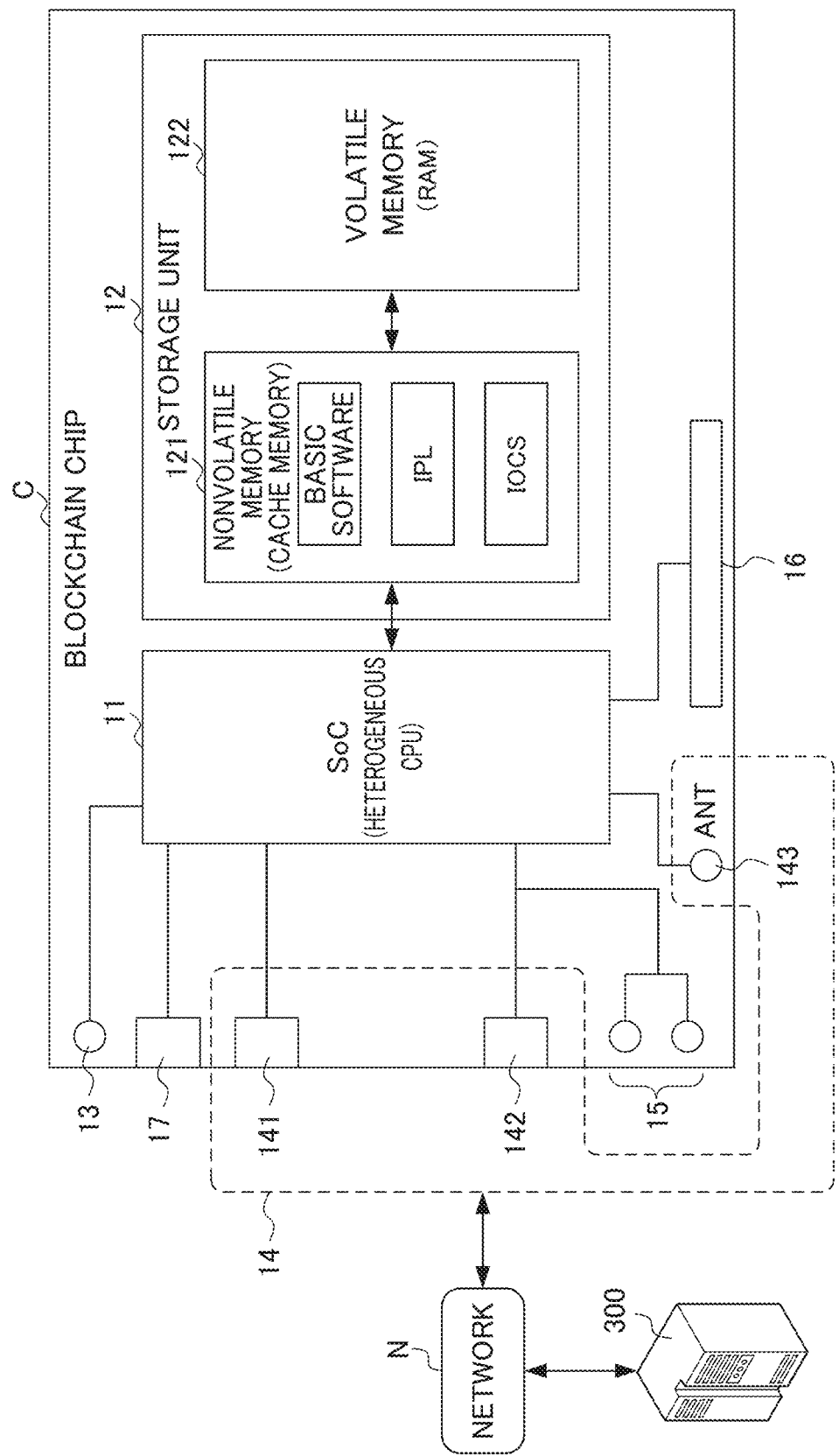
FIG. 1 is a diagram illustrating a configuration of a blockchain chip according to an embodiment of an electronic device according to the present invention.

FIG. 1 is a diagram illustrating a configuration of a blockchain chip according to an embodiment of an electronic device according to the present invention.

A blockchain chip C illustrated in FIG. 1 is a semiconductor product in a mode of SIP (System in a Package). The blockchain chip C is configured by loading, on a substrate 10, a CPU (Central Processing Unit) 11, a storage unit 12, a reset button 13, a communication unit 14, an indicator 15, an identifier 16, and a power acquisition unit 17.

The substrate 10 is a small substrate in a size of about 20 mm by 40 mm. Note, however, that the mode of the substrate 10 is not specifically limited, and it is possible to select various kinds of modes in accordance with its usage.

The CPU 11 is a heterogeneous CPU in a mode of SoC (System on Chip) where peripheral circuits are mounted. The CPU 11 executes various kinds of processing according to a program recorded in advance in a nonvolatile memory (cache memory) 121 to be described later and a loaded program.

The storage unit 12 is configured to include the nonvolatile memory (cache memory) 121 and a volatile memory (RAM: Random Access Memory) 122.

The nonvolatile memory (cache memory) 121 is configured with software to be the basis of operations (referred to as "basic software" hereinafter), an IPL (Initial Program Loader), and an IOCS (Input-Output Control System). The IPL is a program for loading the blockchain main body to the nonvolatile memory (cache memory) 121. The IOCS is a program for executing control of peripheral devices, and the basic software together with the IOCS configures the basic program for operating the blockchain chip C. As described, the nonvolatile memory (cache memory) 121 can be in a simple configuration.

Note here that the blockchain chip C at the time of shipment does not have the blockchain main body loaded thereon. Therefore, it is possible to load and operate the latest version of blockchain main body at all times. Furthermore, with the blockchain chip C, it is possible to easily upgrade the version of the blockchain main body even during operation by simply resetting the blockchain chip C through pressing down the reset button 13 to be described later.

The volatile memory (RAM) 122 is a main memory used for the CPU 11 to control execution of various kinds of processing, and data and the like necessary for the CPU 11 to control execution of various kinds of processing are stored therein as appropriate.

The reset button 13 is a button for resetting the blockchain chip C back to the initial state.

The communication unit 14 communicates with other devices (for example, a cloud server 300, other blockchain chips C, and the like) via a network N including the Internet. The communication unit 14 receives a prescribed program (for example, a blockchain main body), for example, from outside. The communication unit 14 can be configured to include a LAN terminal 141, an input/output (I/O) port 142, and a Bluetooth (registered trademark) antenna 143.

The indicator 15 is an indicator that indicates the state of the blockchain chip C. Specifically, for example, the indicator 15 displays each of initial state, normal state of the blockchain chip C, state during transmission or reception of a program and data, abnormal state, and the like in an identifiable manner. The indicator 15 is configured with an LED (Light Emitting Diode) and the like, for example.

The identifier 16 is a mechanism that makes it possible to visualize an identification number (for example, ID number) that is capable of uniquely identifying the blockchain chip C.

The power acquisition unit 17 acquires the power from a power source and supplies it to the blockchain chip C. Thereby, the blockchain chip C can be driven independently. Furthermore, it can also be used by being loaded on a control substrate in which peripheral circuits are mounted.

Figure 2A:
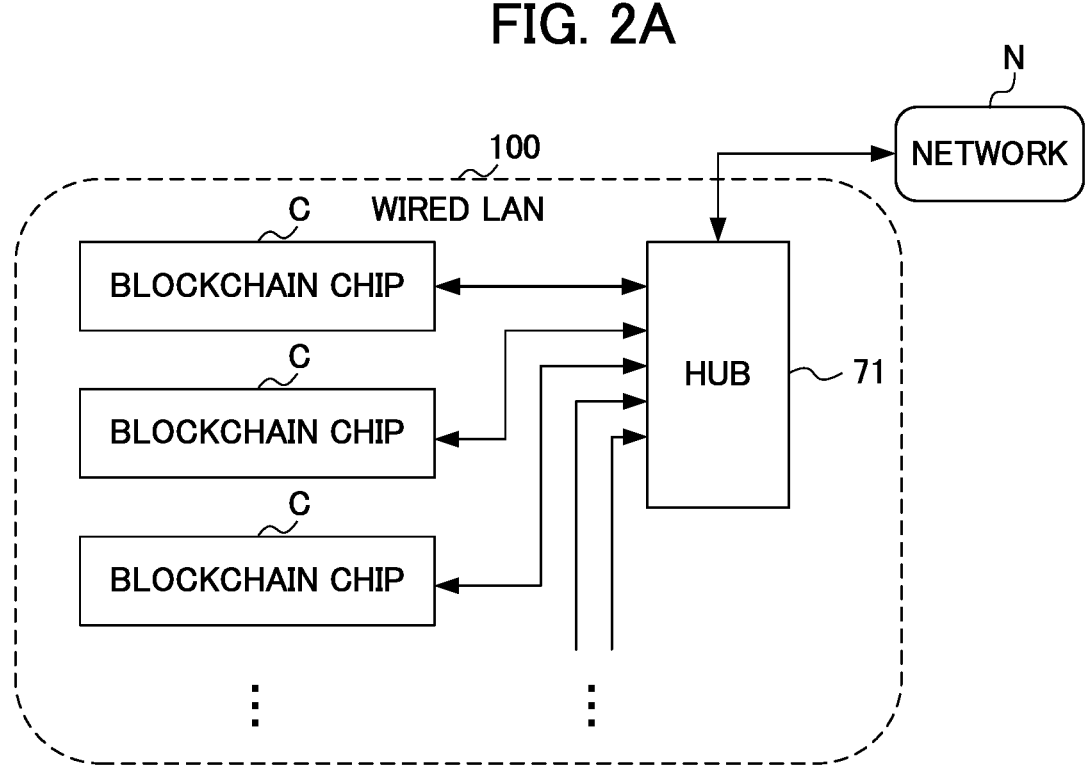
FIG. 2A is a diagram illustrating an example of a case where a LAN (Local Area Network) is built (wired LAN) by connecting a plurality of blockchain chips of FIG. 1.
Figure 2B:
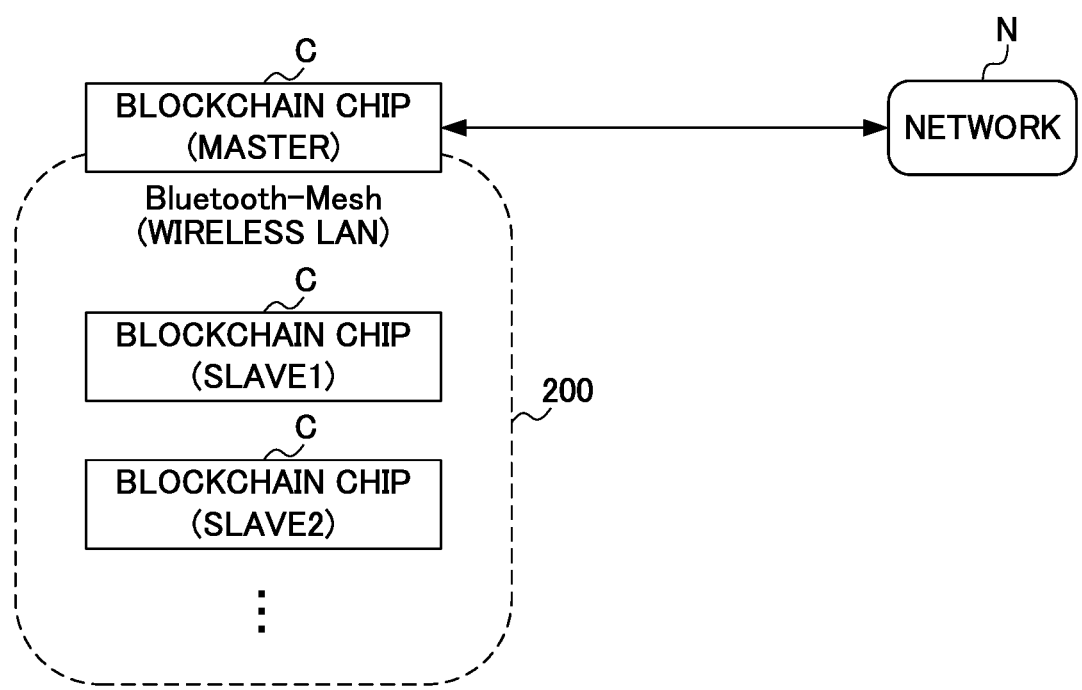
FIG. 2B is a diagram illustrating an example of a case where a LAN (Local Area Network) is built (wireless LAN) by connecting a plurality of blockchain chips of FIG. 1.

FIG. 2A and FIG. 2B are diagrams illustrating examples of a case where a LAN is built by connecting a plurality of blockchain chips of FIG. 1.

FIG. 2A illustrates an example of a case where a wired LAN 100 is built by connecting a plurality of blockchain chips C of FIG. 1. In this case, as illustrated in FIG. 2A, the wired LAN 100 can be built by connecting a plurality of blockchain chips C to a HUB 71, for example.

FIG. 2B illustrates an example of a case where a wireless LAN 200 is built by connecting a plurality of blockchain chips C of FIG. 1. As illustrated in FIG. 2B, it is possible to build the wireless LAN 200 by using a technology of Bluetooth-Mesh (registered trademark) that enables mutual communication among a plurality of devices, for example. In this case, for example, a single blockchain chip C as the master is connected to the network N, and one or more of other blockchain chips C are caused to function as slaves.

Figure 3:
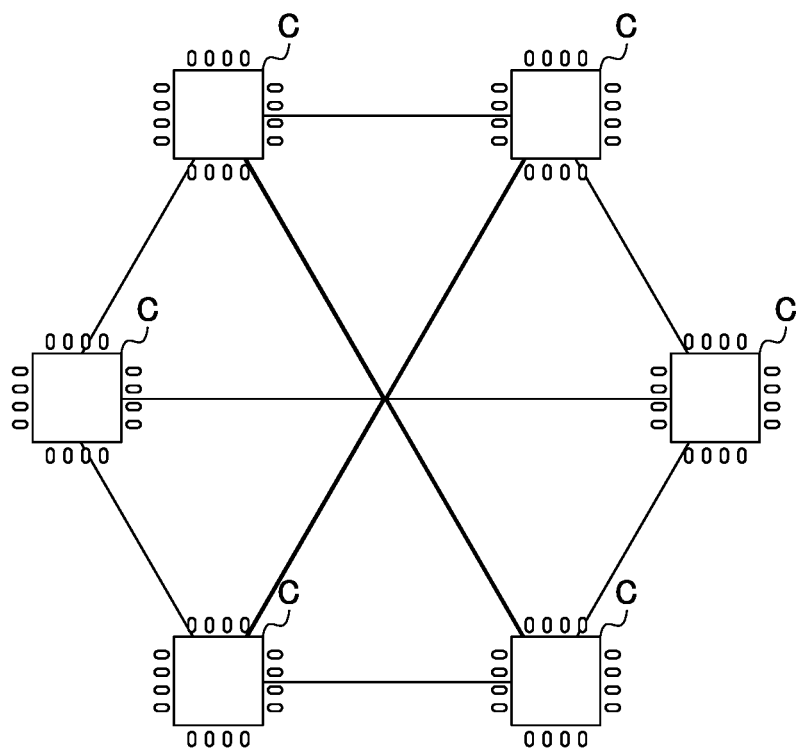
FIG. 3 is an image diagram of a distributed AI (Artificial Intelligence) system that can be achieved by connecting a plurality of blockchain chips of FIG. 1.

FIG. 3 is an image diagram of a distributed AI (Artificial Intelligence) system that can be achieved by connecting a plurality of blockchain chips of FIG. 1.

With the blockchain chip C illustrated in FIG. 1, it is possible to achieve the distributed AI (Artificial Intelligence) system. A conventionally existing AI (Artificial Intelligence) system performs various kinds of inference by analyzing tendencies based on information accumulated in a single server or the like that performs central processing. Note, however, that there are the risks of data destruction and data falsification when the information is accumulated in a single server or the like. On the contrary, when the blockchain chip C of FIG. 1 is applied to the AI (Artificial Intelligence) system, the server or the like performing the central processing is unnecessary since each of the plurality of blockchain chips C functions as a node. In this case, it is also possible to perform processing of more than a large-scale server by increasing the number of the blockchain chips C. Note here that the accuracy of the input data itself is important with the AI (Artificial Intelligence) system. In a conventional AI (Artificial Intelligence) system, reliability is scrutinized by postprocessing performed for the data accumulated in a single server or the like. Since various kinds of input information is processed by a single server or the like, the load of the server or the like is increased so that the real-time processing may not be executed by the CPU. With the AI (Artificial Intelligence) system to which the blockchain chip C is applied, however, it is possible to guarantee the accuracy of data at the time of sensing where the blockchain chip C acquires the data.

Next, the sensor system to which the blockchain chip C of FIG. 1 is applied will be described by referring to FIG. 4.

Figure 4:
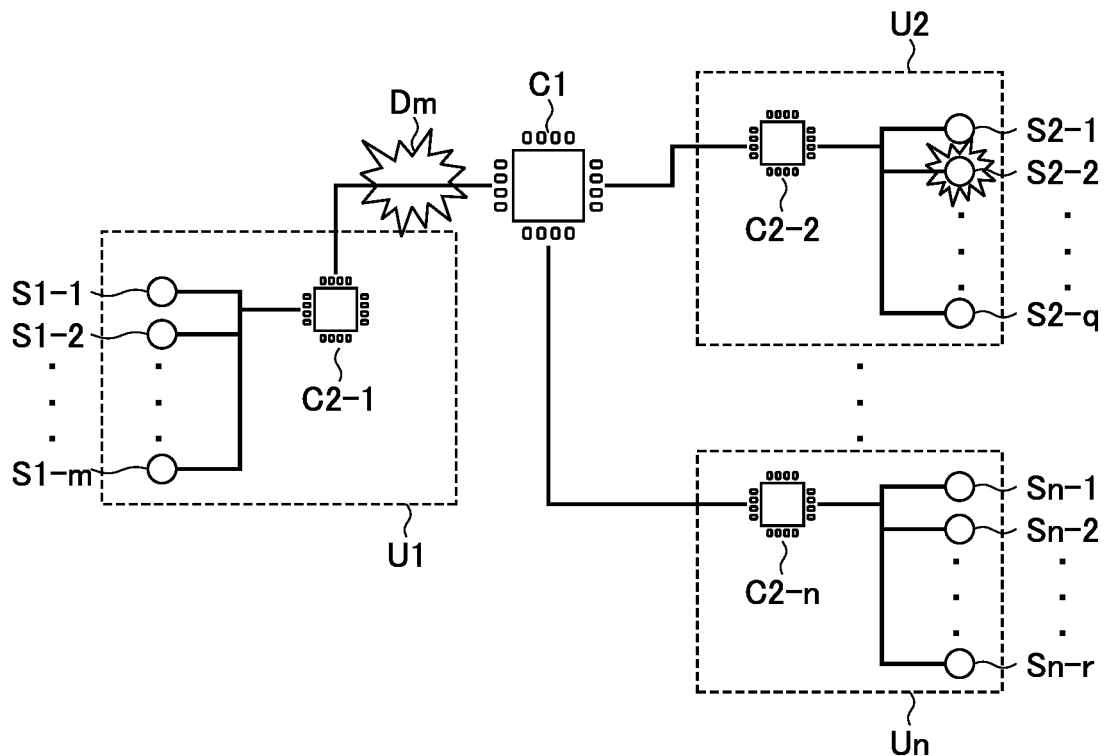
FIG. 4 is a diagram illustrating a configuration of a sensor system according to an embodiment of an information processing system according to the present invention.

FIG. 4 is a diagram illustrating a configuration of a sensor system according to an embodiment of an information processing system according to the present invention. The sensor system illustrated in FIG. 4 is configured to include a central heterogeneous chip C1 and n-pieces ("n" is an arbitrary integer value of 1 or larger) of heterogeneous sensor units U1 to Un. In the sensor system of FIG. 4, each of the heterogeneous sensor units U1 to Un is connected to the central heterogeneous chip C1 with wire. The heterogeneous sensor unit U1 is configured to include a sensor-side heterogeneous chip C2-1 and m-pieces ("m" is an arbitrary integer value of 1 or more independent of "n") of sensors S1-1 to S1-$m$. The heterogeneous sensor unit U2 is configured to include a sensor-side heterogeneous chip C2-2 and q-pieces ("q" is an arbitrary integer value of 1 or more independent of "n" and "m") of sensors S2-1 to S2-$q$. The heterogeneous sensor unit Un is configured to include a sensor-side heterogeneous chip C2-$n$ and r-pieces ("r" is an arbitrary integer value of 1 or more independent of "n", "m" and "q") of sensors Sn-1 to Sn-r.

While there is only a single central heterogeneous chip C1 illustrated in the example of FIG. 4 for the sake of explanation, the number thereof is not specifically limited thereto but there may be a plurality of the chips. Similarly, while each of the heterogeneous sensor units U1 to Un includes respective sensor-side heterogeneous chips C2-1 to C2-n in the example of FIG. 4 for the sake of explanation, the number thereof is not specifically limited thereto but there may be a plurality of the chips.

Furthermore, when it is not specifically necessary to distinguish each of the heterogeneous sensor units U1 to Un, they are collectively referred to as "heterogeneous sensor unit U". In such a case where they are referred to as the heterogeneous sensor unit U, each of the sensor-side heterogeneous chips C2-1 to C2-n is collectively referred to as "sensor-side heterogeneous chip C2".

Furthermore, when it is not specifically necessary to distinguish each of the sensors S1-1 to S1-m, they are collectively referred to as "sensor S1". Similarly, when it is not specifically necessary to distinguish each of the sensors S2-1 to S2-q, they are collectively referred to as "sensor S2". Similarly, when it is not specifically necessary to distinguish each of the sensors Sn-1 to Sn-r, they are collectively referred to as "sensor Sn". Furthermore, when it is not specifically necessary to distinguish each of the sensors S1 to Sn, they are collectively referred to as "heterogeneous sensor S".

The central heterogeneous chip C1 is an electronic device to which the blockchain chip C of FIG. 4 is applied, which executes processing as the entire sensor system of FIG. 4.

The heterogeneous sensor unit U is a circuit board that includes the sensor-side heterogeneous chip C2 and the sensors S, for example. Like the central heterogeneous chip C1, the sensor-side heterogeneous chip C2 is an electronic device to which the blockchain chip C of FIG. 4 is applied, and executes the processing as the entire heterogeneous sensor unit U. The sensor S is an element or the like that collects information of a certain target and converts it to signals that can be handled by a machine, and examples thereof may be various kinds of sensors or the like that output quantified data regarding temperature, humidity, pressure, electric current, voltage, and the like, nonnumeric data such as image data, audio data, and the like to outside. Specifically, for example, the sensor-side heterogeneous chip C2 executes processing for monitoring each of the sensors S provided within the same heterogeneous sensor unit U. Furthermore, the sensor-side heterogeneous chip C2 executes processing for performing transmission, processing, and the like of data detected by the sensors S, for example.

Note here that data anomaly Dm in FIG. 4 is caused due to lightening, electrostatic discharge phenomenon, electromagnetic noise or the like from other electronic devices imposed on the sensor system of FIG. 4. With the sensor system of FIG. 4, data garbling that induces malfunction of the system is particularly an issue. Note here that "data garbling" means a phenomenon where a bit is inverted from its original value due to some kind of reason in a data transmission channel, a memory, and the like. Note, however, that the factor for inducing system malfunction is not limited thereto. That is, for example, not only data destruction caused by drop in power supply voltage, pulse noise, magnetic storm such as solar wind flare, and the like but also abnormal signal output and the like due to failure or the like of the sensor S may also induce system malfunction. The sensor system of FIG. 4 according to the embodiment of the present invention is extremely effective in that it is possible to prevent data garbling caused by various phenomena that may be different causes for the malfunction described above.

Figure 5:
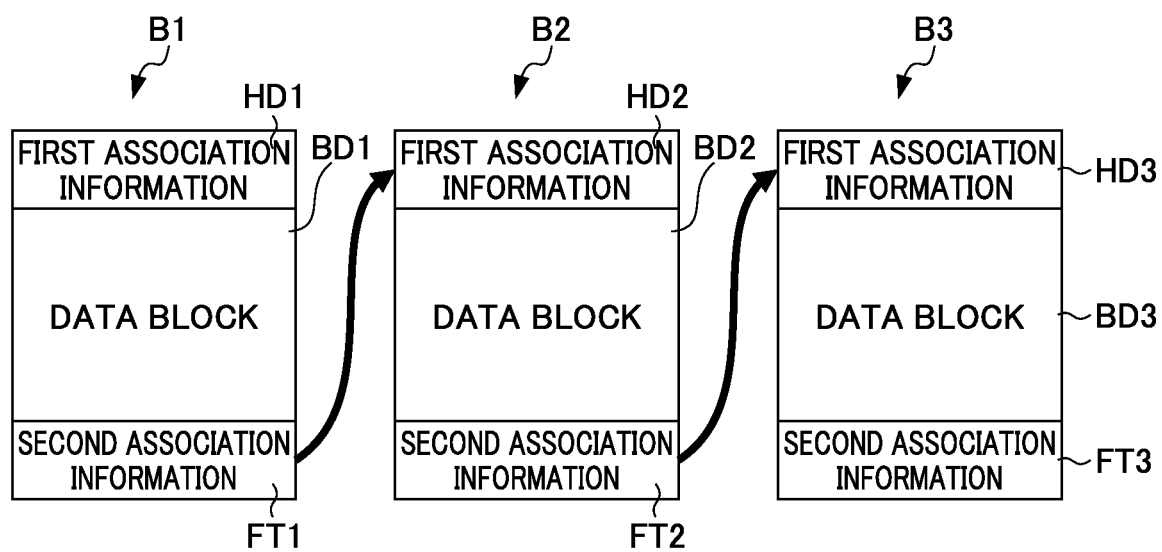
FIG. 5 is a diagram illustrating a specific example of a structure of data transmitted between a central heterogeneous chip and a sensor-side heterogeneous chip in the sensor system of FIG. 4.

Now, in the example of FIG. 4, a case of having a failure occurred in the sensor S2-2, for example, will be discussed. In this case, the failed sensor S2-2 comes to output anomalous data. In this regard, for example, when the sensor system of FIG. 4 does not include the sensor-side heterogeneous chip C2 in its configuration and only the central heterogeneous chip C1 manages information on input/output and the like of the whole sensors, the CPU of the central heterogeneous chip C1 performs data validation check processing of the whole information on all inputs/outputs and the like if a failure occurs in the sensor S2-2, thereby increasing the load thereof. In this case, it may not be possible to promptly process and handle anomalous data output from the sensor S2-2 in many cases. Meanwhile, when the sensor system of FIG. 4 includes the sensors S2 and the sensor-side heterogeneous chips C2 in its configuration, the sensor-side heterogeneous chip C2-2 upon detecting a failure of the sensor S2-2 cuts off external output of anomalous data from the sensor S2-2, for example, thereby making it possible to prevent malfunction of the entire sensor system. However, with such distributed management of data alone, there is a problem that it is not possible to have a way to deal with lightening, an electrostatic discharge phenomenon, electromagnetic noise or the like from other electronic devices. In order to overcome such a problem, data in a structure illustrated in FIG. 5 is employed as transmission data between the central heterogeneous chip C1 and the sensor-side heterogeneous chip C2 by using a blockchain technology, for example. This makes it possible to check data garbling and destruction on the sensor-side heterogeneous chip C2 side and also to immediately notify the information to the central heterogeneous chip C1 when data garbling, destruction, and the like are actually discovered. Therefore, it is possible to prevent malfunction of the entire sensor system.

FIG. 5 is a diagram illustrating a specific example of the structure of data transmitted between the central heterogeneous chip and the sensor-side heterogeneous chip in the sensor system of FIG. 4. The unit of data transmitted to the central heterogeneous chip C1 from one sensor-side heterogeneous chip C2 is each of transmission blocks B1 to B3 illustrated in FIG. 5. While only three transmission blocks B1 to B3 are illustrated in FIG. 5 for the sake of explanation, there are actually n-pieces ("n" is an arbitrary integer value of 1 or larger and theoretically there is no upper limit thereof) of transmission blocks B1 to Bn. Hereinafter, explanations will be provided by referring to the p-th ("p" is an arbitrary integer value among 1 to n) transmission block Bp. The transmission block Bp is in a structure that includes a data block BDp containing actual content for the transmission unit, first association information HDp appended before the data block BDp, and second association information FTp appended after the data block BDp. The first association information HDp is generated by using the blockchain technology based on the previous data block BD(p−1) transmitted and received right before. Specifically, for example, the first association information HDp is a hash value of the data block BD(p−1). The second association information FTp is generated by using the blockchain technology based on the current data block BDp as the transmission target. Specifically, for example, the second association information FTp is a hash value of the data block BDp.

In the heterogeneous sensor unit U2, the transmission block Bp as the current target to be transmitted to the heterogeneous sensor unit U1 is correlated with the previously transmitted transmission block B(p−1) by using the blockchain technology, and it is stored and managed in a prescribed storage medium (the storage unit 12 or the like of FIG. 6 to be described later). That is, in a prescribed recording medium, a data group in which each of the transmission blocks B1 to Bp is chained together is stored and managed. More specifically, concerning the two continuous transmission blocks B(p−1) and Bp, the transmission blocks B1 to Bp are chained together by such a rule that the second association information FT(p−1) included in the previous transmission block B(p−1) is made consistent with the first association information HDp included in the transmission block Bp as the target of current transmission. That is, the first association information HDp of the transmission block Bp and the second association information FT(p−1) of the previous transmission block B(p−1) are the data of the same content. Furthermore, the second association information FTp of the transmission block Bp and the first association information HD(p+1) of the next transmission block B(p+1) are the data of the same content.

Figure 6:
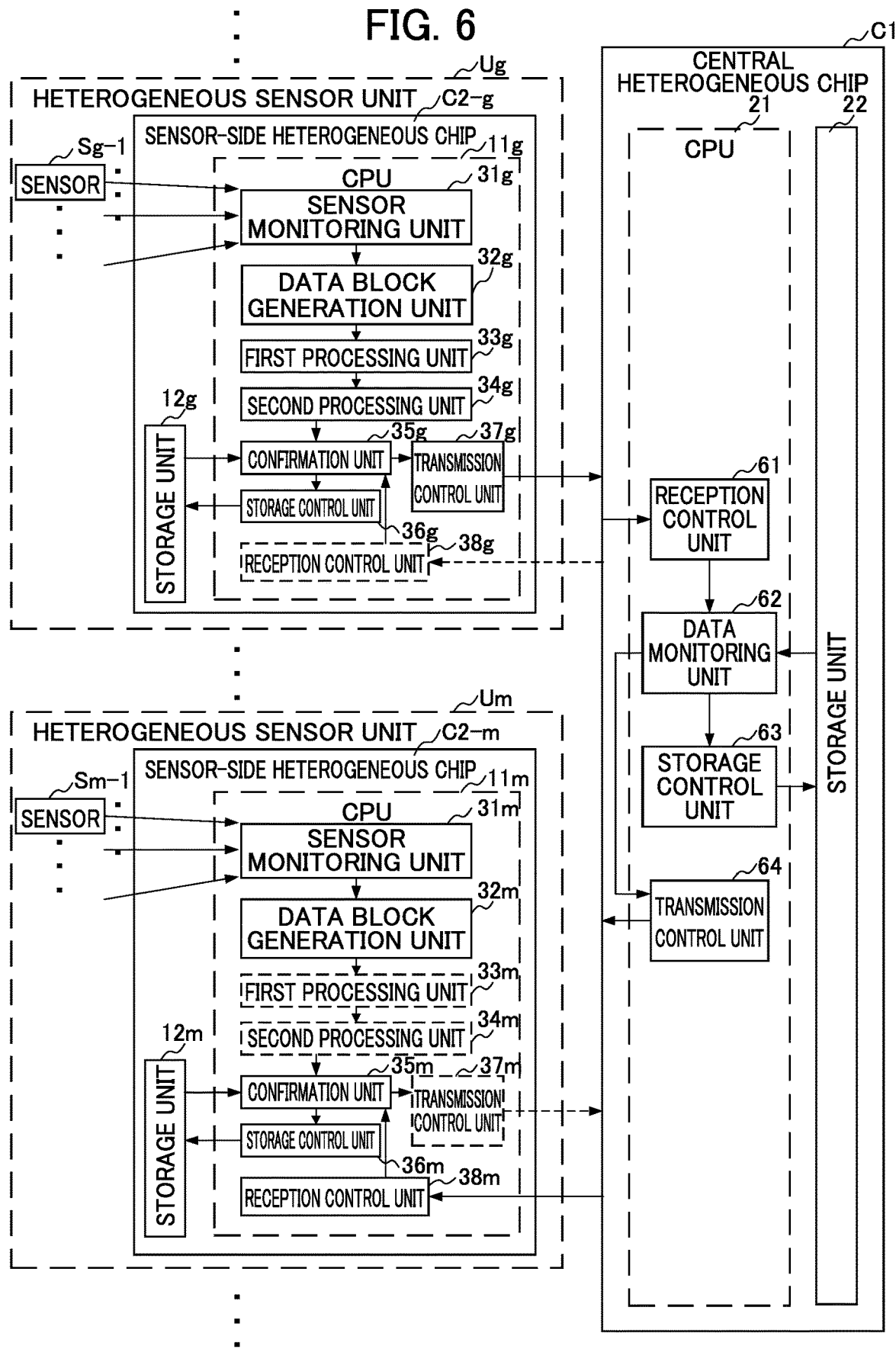
FIG. 6 is a diagram illustrating an example of a functional configuration of the central heterogeneous chip and the sensor-side heterogeneous chip in the sensor system of FIG. 4.

FIG. 6 is a diagram illustrating an example of the functional configuration of the central heterogeneous chip and the sensor-side heterogeneous chip in the sensor system of FIG. 4.

A heterogeneous sensor unit Ug ("g" is an arbitrary integer value among 1 to n) includes sensors Sg-1 to Sg-t ("t" is an arbitrary integer value of 1 or larger independent of "n") and a sensor-side heterogeneous chip C2-g. When it is not specifically necessary to distinguish each of the sensors Sg-1 to Sg-t, those are collectively referred to as "sensor Sg". The sensor-side heterogeneous chip C2-g includes a CPU 11g and a storage unit 12g.

In the CPU 11g of the sensor-side heterogeneous chip C2-g, as illustrated in FIG. 6, a sensor monitoring unit 31g, a data block generation unit 32g, a first processing unit 33g, a second processing unit 34g, a confirmation unit 35g, a storage control unit 36g, a transmission control unit 37g, and a reception control unit 38g function.

The sensor monitoring unit 31g monitors the sensor Sg. That is, the sensor monitoring unit 31g acquires data regarding the operation state of the sensor Sg to determine occurrence of an anomaly based on the data and, when determined as having an anomaly, generates data indicating so. Furthermore, when determined that there is an anomaly in the operation state of the sensor Sg, the sensor monitoring unit 31g cuts off the signal detected by the sensor Sg.

The data block generation unit 32g generates the current (k-th among 1 to k) transmission target data (for example, data output from the sensor monitoring unit 31g) as a data block BDk.

By using the blockchain technology, the first processing unit 33g generates the first association information HDk based on the data block BD(k−1) included in the previous transmission block B(k−1), and appends the first association information HDk to the data block BDK. While the first association information HDk is appended at a header position of the data block BDk in the embodiment, it is simply presented as an example. That is, the appending position of the first association information HDk may be determined arbitrarily, and a footer position of the data block BDk may be employed, for example.

By using the blockchain technology, the second processing unit 34g generates the second association information FTk based on the data block BDk included in the current transmission block Bk, and appends the second association information FTk to the data block BDk. While the second association information FTk is appended at the footer position of the data block BDK in the embodiment, it is simply presented as an example. That is, the appending position of the second association information FTk may be determined arbitrarily, and the header position of the data block BDk may be employed, for example.

The confirmation unit 35g checks whether the hash value generated based on the data block BD(k−1) and the first association information HDk are the same content. That is, when the hash value generated based on the data block BD(k−1) stored in the storage unit 12g matches the first association information HDk appended as the header of the data block BDk, the confirmation unit 35g can confirm that there is no problem in the data block BD(k−1) stored in the storage unit 12g. Meanwhile, when they do not match, it is highly probable that there is some kind of problem generated in the data block BD(k−1) stored in the storage unit 12g and that it is also highly probable that the data block BDk has a problem when the data block BDk is generated based thereupon.

The storage control unit 36g executes control for correlating the transmission block that is the data block BDk, to which the first association information HDk and the second association information FTk are appended, with other transmission blocks including the data block BD(k−1) by using the blockchain technology and for storing the correlation in the prescribed storage medium. That is, the storage control unit 36g executes control for storing the correlation of the transmission block that is the data block BDk, to which the first association information HDk and the second association information FTk are appended, with other transmission blocks including the data block BD(k−1) in the prescribed storage medium in a state capable of detecting data garbling.

The transmission control unit 37g executes control for transmitting, as the transmission block for which the blockchain technology is used, the data block BDk to which the first association information HDk and the second association information FTk are appended.

The reception control unit 38g executes control for receiving various kinds of information transmitted from various kinds of hardware (for example, the central heterogeneous chip C1 and the like).

Subsequently, an example of the functional configuration of the central heterogeneous chip C1 will be described. In a CPU 21 of the central heterogeneous chip C1, as illustrated in FIG. 6, a reception control unit 61, a data monitoring unit 62, a storage control unit 63, and a transmission control unit 64 function.

The reception control unit 61 executes control for receiving various kinds of information transmitted from various kinds of hardware (for example, the sensor-side heterogeneous chip C2 and the like).

The data monitoring unit 62 checks whether the second association information FT(k−1) stored in a prescribed storage medium (a storage unit 22 or the like) and the first association information HDk are the same content. That is, when the second association information FT(k−1) stored in the prescribed storage medium (the storage unit 22 or the like) matches the first association information HDk that is appended as the header of the data block BDk received at the reception control unit 61, the data monitoring unit 62 can confirm that there is no problem in the transmitted data block BDk. Meanwhile, when they do not match, it is highly probable that there is some kind of problem generated in the transmitted data block BDk. Furthermore, the data monitoring unit 62 checks whether the hash value generated based on the data block BDk and the second association information FTk are the same content. That is, when the hash value generated based on the data block BDk matches the second association information FTk appended as the footer of the data block BDk, the data monitoring unit 62 can confirm that there is no problem generated in the transmission information. Meanwhile, when they do not match, it is highly probable that there is some kind of problem generated in the transmission information.

The storage control unit 63 executes control for correlating the transmission block that is the data block BDk, to which the first association information HDk and the second association information FTk are appended, with other transmission blocks including the data block BD(k−1) by using the blockchain technology and for storing the correlation in the prescribed storage medium. That is, the storage control unit 63 executes control for storing the correlation of the transmission block that is the data block BDk, to which the first association information HDk and the second association information FTk are appended, with other transmission blocks including the data block BD(k−1) in the storage unit 22 in a state capable of detecting data garbling.

The transmission control unit 64 executes control for transmitting, as the transmission block for which the blockchain technology is used, the data block BDk to which the first association information HDk and the second association information FTk are appended.

Now, specific application examples of the sensor system according to the embodiment will be described hereinafter.

First Application Example

The sensor system of FIG. 4 can be applied to robot management in factories, for example. Specifically, for example, the heterogeneous sensor unit U is provided with various kinds of sensors S for detecting pressures and temperatures at each section of a manufacturing robot within a factory. The sensor-side heterogeneous chip C2 in the heterogeneous sensor unit U generates the data block BDk by quantifying the detection result of those various kinds of sensors S, that is, the pressures and temperatures at each section of the manufacturing robot in the factory. By using the blockchain technology, the sensor-side heterogeneous chip C2 generates the first association information HDk based on the data block BD(k−1) of the previous transmission block B(k−1) and appends the first association information HDk to the data block BDk. By using the blockchain technology, the sensor-side heterogeneous chip C2 generates the second association information FTk based on the current data block BDk and appends the second association information FTk to the data block BDk. The sensor-side heterogeneous chip C2 correlates the transmission block Bk, to which the first association information HDk and the second association information FTk are appended, with the previous transmission block B(k−1) by using the blockchain technology and stores the correlation in the prescribed storage medium such as the storage unit 12. Furthermore, the sensor-side heterogeneous chip C2 transmits the transmission block Bk to the central heterogeneous chip C1. The central heterogeneous chip C1 recognizes the record of quantified pressures and temperatures at each section from the transmission block Bk. Then, the central heterogeneous chip C1 determines whether the manufacturing robot in the factory is operating accurately.

The sensor system of FIG. 4 can achieve following first and second effects by being applied to robot management in the factory as in the first application example. The first effect is that the sensor-side heterogeneous chip C2 and the central heterogeneous chip C1 can deal with malfunction of the manufacturing robot and the sensors. The second effect is that the sensor-side heterogeneous chip C2 and the central heterogeneous chip C1 can prevent malfunction of the robot in the factory by detecting data garbling and data destruction of the numerical values inside the manufacturing robot.

Second Application Example

The sensor system of FIG. 4 can be applied to a vehicle control system, a train control system, a ship control system, and the like having a restricted available space, for example.

Specifically, for example, the heterogeneous sensor unit U is provided with various kinds of sensors S that detect acceleration and the like useful for the vehicle control system, the train control system, and the ship control system to estimate vibration and tilt of a car body or a hull. The sensor-side heterogeneous chip C2 in the heterogeneous sensor unit U generates the data block BDk by quantifying the detection result of those various kinds of sensors S, that is, the acceleration and the like of the vehicle control system, the train control system, and the ship control system. By using the blockchain technology, the sensor-side heterogeneous chip C2 generates the first association information HDk based on the data block BD(k−1) of the previous transmission block B(k−1) and appends the first association information HDk to the data block BDk. By using the blockchain technology, the sensor-side heterogeneous chip C2 generates the second association information FTk based on the current data block BDk and appends the second association information FTk to the data block BDk. The sensor-side heterogeneous chip C2 correlates the transmission block Bk, to which the first association information HDk and the second association information FTk are appended, with the previous transmission block B(k−1) by using the blockchain technology and stores the correlation in the prescribed storage medium such as the storage unit 12. Furthermore, the sensor-side heterogeneous chip C2 transmits the transmission block Bk to the central heterogeneous chip C1. The central heterogeneous chip C1 recognizes the record of behaviors of the numerical values of the sensors during the operation from the transmission block Bk. Then, the central heterogeneous chip C1 can check whether the operation is being conducted properly based on the record of the numerical values of the sensors S.

The sensor system of FIG. 4 can achieve a following effect by being applied to the vehicle control system, the train control system, and the ship control system as in the second application example. The effect is that the sensor-side heterogeneous chip C2 and the central heterogeneous chip C1 record the behaviors of the numerical values during the operations of the vehicle, the train, and the ship so that it is possible to check the data and conduct the optimal operation of the control systems.

Third Application Example

The sensor system of FIG. 4 can be applied to management of drone data, for example. Specifically, for example, the heterogeneous sensor unit U is provided with various kinds of sensors S for detecting the GPS coordinates, altitudes, and the like. The sensor-side heterogeneous chip C2 in the heterogeneous sensor unit U generates the data block BDk from the detection result of those various kinds of sensors S, that is, the GPS coordinates, the altitudes, and the like. By using the blockchain technology, the sensor-side heterogeneous chip C2 generates the first association information HDk based on the data block BD(k−1) of the previous transmission block B(k−1) and appends the first association information HDk to the data block BDk. By using the blockchain technology, the sensor-side heterogeneous chip C2 generates the second association information FTk based on the current data block BDk and appends the second association information FTk to the data block BDk. The sensor-side heterogeneous chip C2 correlates the transmission block Bk, to which the first association information HDk and the second association information FTk are appended, with the previous transmission block B(k−1) by using the blockchain technology and stores the correlation in the prescribed storage medium such as the storage unit 12. Furthermore, the sensor-side heterogeneous chip C2 transmits the transmission block Bk to the central heterogeneous chip C1. The central heterogeneous chip C1 recognizes the GPS coordinates, the altitudes, and the like from the transmission block Bk. Then, the central heterogeneous chip C1 records various kinds of data acquired by the drone to be able to manage the data.

The sensor system of FIG. 4 can achieve a following effect by being applied to the drone as in the third application example. The effect is that it becomes possible to perform drone explorations and inspections based on the various kinds of data recorded by the sensor-side heterogeneous chip C2 and the central heterogeneous chip C1.

Fourth Application Example

The sensor system of FIG. 4 can be applied to remote operation management of leased items, for example. Specifically, for example, the heterogeneous sensor unit U is provided with various kinds of sensors S for detecting the operation history and the like as well as precursory phenomenon of failures. The sensor-side heterogeneous chip C2 in the heterogeneous sensor unit U generates the data block BDk by quantifying the detection result of these various kinds of sensors S, that is, the data of the operation history and the like as well as precursory phenomenon of failures. By using the blockchain technology, the sensor-side heterogeneous chip C2 generates the first association information HDk based on the data block BD(k−1) of the previous transmission block B(k−1) and appends the first association information HDk to the data block BDk. By using the blockchain technology, the sensor-side heterogeneous chip C2 generates the second association information FTk based on the current data block BDk and appends the second association information FTk to the data block BDk. The sensor-side heterogeneous chip C2 correlates the transmission block Bk, to which the first association information HDk and the second association information FTk are appended, with the previous transmission block B(k−1) by using the blockchain technology and stores the correlation in the prescribed storage medium such as the storage unit 12. Furthermore, the sensor-side heterogeneous chip C2 transmits the transmission block Bk to the central heterogeneous chip C1. The central heterogeneous chip C1 recognizes various kinds of numerical data of the leased item from the transmission block Bk. Then, the central heterogeneous chip C1 records various kinds of numerical data of the leased item to be able to manage the operation of the leased item from a distant place.

The sensor system of FIG. 4 can achieve a following effect by being applied to the remote operation management of the leased item as in the fourth application example. The effect is that it is possible to manage the operation of the leased item from a distant place, thereby making it possible to save labor and time of periodic inspections and the like.

Fifth Application Example

The sensor system of FIG. 4 can be applied to system management of game machines (for example, a pachinko machine, a pachislot machine, and an arcade game machine), for example. Specifically, the heterogeneous sensor unit U is provided with various kinds of sensors S for acquiring operation information of the system. The sensor-side heterogeneous chip C2 in the heterogeneous sensor unit U generates the data block BDk from the detection result of those various kinds of sensors S, that is, operation information of the system of the game machine. By using the blockchain technology, the sensor-side heterogeneous chip C2 generates the first association information HDk based on the data block BD(k−1) of the previous transmission block B(k−1) and appends the first association information HDk to the data block BDk. By using the blockchain technology, the sensor-side heterogeneous chip C2 generates the second association information FTk based on the current data block BDk and appends the second association information FTk to the data block BDk. The sensor-side heterogeneous chip C2 correlates the transmission block Bk, to which the first association information HDk and the second association information FTk are appended, with the previous transmission block B(k−1) by using the blockchain technology and stores the correlation in the prescribed storage medium such as the storage unit 12. Furthermore, the sensor-side heterogeneous chip C2 transmits the transmission block Bk to the central heterogeneous chip C1. The central heterogeneous chip C1 recognizes the operation information of the system of the game machine from the transmission block Bk. Then, the central heterogeneous chip C1 records the operation information of the system in the blockchain to be able to grasp the state of the machine.

The sensor system of FIG. 4 can achieve a following effect by being applied to the game machines as in the fifth application example. The effect is that it is possible to secure the reliability by recording the operation information of the system in the blockchain Sixth Application Example FIG. 7A and FIG. 7B are image diagrams illustrating examples of cases where the sensor system of FIG. 4 is applied to control automobiles.

Figure 7A:
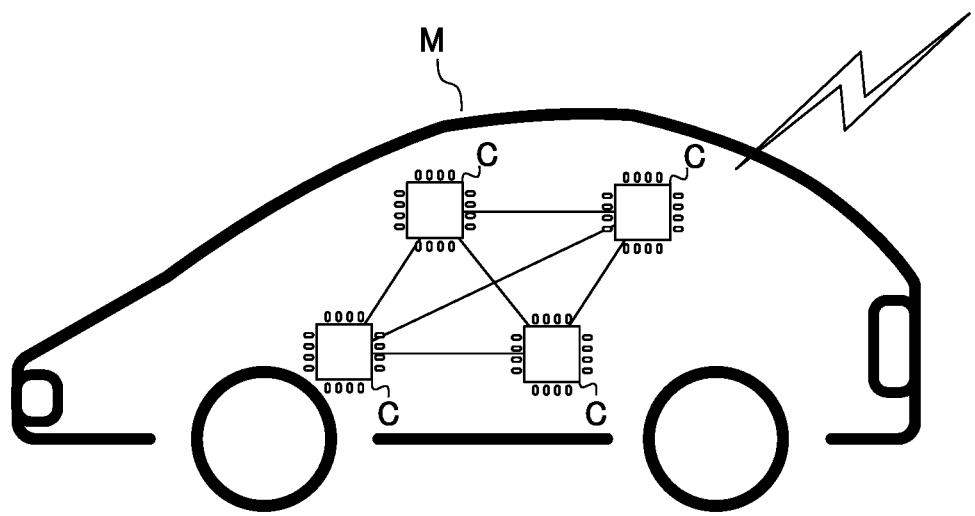
FIG. 7A is an image diagram illustrating an example of a case where the sensor system of FIG. 4 is applied to control of an automobile.

FIG. 7A is an image diagram illustrating an example of a case where the sensor system of FIG. 4 is loaded on an automobile M. As in the case of the second application example described above, when the sensor system of FIG. 4 is applied to control a vehicle, particularly to control the automobile M, not only the effects described above but also a following effect can be expected, for example. Conventionally, as a technology for controlling automobiles, there are an autonomous self-driving technology and a technology for executing control of various kinds of operations by processing, with a plurality of CPUs, data acquired from each of the sensors. Specifically, for example, there are a technology for executing control of operation of the system such as the engine, transmission, and power steering of an automobile, and a technology for executing control of operations for assisting the user, such as ABS (Anti-lock Brake System), adaptive cruise control, and automatic parking. There is also a technology with which an automobile is caused to function as an ICT (information communication technology) terminal like the so-called connected car so as to collect and process various kinds of data in a cloud. However, in a case of a connected car connected to a cloud server, there is a risk that the traveling itself may be operated by an intrusion (cracking) of a malicious external third party. On the contrary, in a case where the sensor system of FIG. 4 using the blockchain chip C is loaded on the automobile M, interrelation of data from each of the sensors loaded on the automobile M can be checked so that it is possible to promptly detect the accuracy of the data. Furthermore, since it is possible to estimate or select the data in advance in units of sensors for each sensor environment, the load of the CPU can be lightened. As a result, it is possible to achieve real-time processing.

Figure 7B:
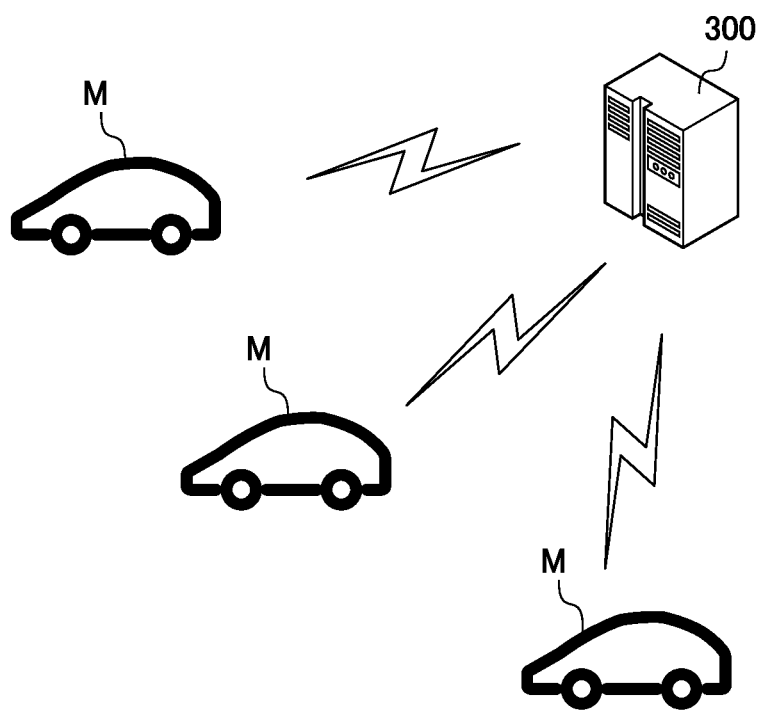
FIG. 7B is an image diagram illustrating an example of a case where the sensor system of FIG. 4 is applied to control of automobiles, which is different from the case of FIG. 7A.

FIG. 7B is an image diagram illustrating an example of a case where the sensor system of FIG. 4 is loaded on a plurality of automobiles M. That is, as illustrated in FIG. 7B, by forming a cloud server 300 in a blockchain having the blockchain chips C as the nodes, the data whose accuracy is secured by distributed processing can be shared and used by all of the automobiles M.

Seventh Application Example

The sensor system of FIG. 4 can be applied to a network monitoring camera, for example. There is a conventionally existing network monitoring camera. With the conventionally existing network monitoring camera, it is possible to check data of capture images, to detect operations, to perform face authentication, and the like remotely. However, with the data of images captured by the network monitoring camera, there are the risks of data destruction and data falsification due to an intrusion (cracking) of a malicious external third party. On the contrary, in a case where the sensor system of FIG. 4 using the blockchain chip C is applied to the network monitoring camera, distributed processing by a plurality of network cameras can be achieved. Therefore, it is possible to secure reliable data and to share the data. That is, since the data detected by a certain monitoring camera can be shared with other monitoring cameras, it becomes easy to track a specific person.

While each of the embodiments of the information processing system according to the present invention is described above, the present invention is not limited to the embodiments described above. Furthermore, the effects described in the embodiments are simply a list of examples of the most preferable effects achieved by the present invention, and the effects of the present invention are not limited to those described in the embodiments.

Now, the present invention will be supplementarily described in a simple manner. As described above, in the system related to information transmission and the like among conventional sensors and CPUs, it is common that a single CPU or a small number of CPUs centrally manage the whole output information from the sensors. In order to reduce the processing load of the data validity check for the CPU, it is effective to perform distributed processing in which management of the sensors is distributed for each part. However, as a premise thereof, the risk of data destruction is currently a serious issue in information transmission among the sensors and the CPUs. In other words, currently, it is extremely difficult to prevent the system related to information transmission and the like among conventional sensors and CPUs from having data destruction and data garbling and the like caused due to electrostatic discharge.

In view of such circumstances, an object of the present invention is to provide a form of transmission and saving of data for enhancing data protection during data transmission by the sensors and the like used in IoT (Internet of Things) in order to achieve Distributed Autonomous Organization (DAO) in a computer, for example. That is, as in the embodiments described above, with the heterogeneous chips employing the blockchain technology, the central heterogeneous chip or the like including the CPU and one or more sensor-side heterogeneous chips share the whole or a part of the data in a distributed manner. Therefore, it is possible to provide strong protection means that can promptly detect data destruction, data garbling, and the like caused due to the electrostatic discharge phenomenon and the like and to greatly reduce the load of the control CPU. As a further application, low-cost and mass production becomes possible by using DSP (Digital Signal Processor) as the chip.

For example, while it is described in the embodiments that the first association information HD may be the header of the block, it is not limited thereto but may be appended at an arbitrary position of the block. Similarly, for example, it has been described that the second association information FT may be the footer of the block, but it is not limited thereto and it may be appended at an arbitrary position of the block.

Furthermore, for example, while it is described in the embodiments that the first association information HDp is the hash value of the data block BD(p−1), it is not limited thereto but any values can be applied as long as they are hardly predictable values reproducibly generated based on arbitrary data. Furthermore, for example, the second association information FTp is described as the hash value of the data block BDp, it is not limited thereto but any values can be applied as long as they are hardly predictable values reproducibly generated based on arbitrary data.

Furthermore, for example, the sensor-side heterogeneous chip C2 and the central heterogeneous chip C1 in the embodiments are described to have the CPU. An arbitrary processor capable of performing information processing calculation can be employed for the CPU, and a GPU (Graphic Processing Unit) or the like in addition to the DSP described above may be employed as well.

Furthermore, for example, in a typical sensor system and the like, destruction of data caused by electrostatic discharge and the like is an ordinary daily threat and it is desired to take some countermeasures. For such an issue, to distribute and share the data with various kinds of devices and the like by transmitting a data block (for example, data block Bk) as a transmission unit as in the embodiments described above may be an effective countermeasure. That is, it is because the entire system can be immediately recovered from destruction of data if it is possible to detect inconsistency of the data held among the various kinds of devices and to estimate which one is the authentic data with a certain accuracy. In regards to such distributed sharing, the data is distributed and shared by all of the central heterogeneous chip C1 and the sensor-side heterogeneous chips C2 in the sensor system of the embodiments described above. This makes it possible to distribute and share the data even in a system configuration having a single server and to reduce the risk of having malfunction of the entire system.

More specifically, a blockchain method, which makes it more difficult to falsify the data by appending a hardly predictable hash value or the like to the data block as the transmission unit and adding it in time series, is also effective for data destruction and data garbling.

In the sensor system of FIG. 4, the data is transmitted from the sensors S. Therefore, the sensor-side heterogeneous chips C2 are often the transmission source. When the sensor-side heterogeneous chip C2 transmits data, it is possible to detect whether there is occurrence of data destruction or data garbling by generating a hash value from the data of the last block B(k−1) of the blockchain that is the previously transmitted or previously received block and collating it with the hash value appended to the block as the second association information FT(k−1).

In the sensor system of FIG. 4, there may be cumulative data that determines the content of the latest data block BDk by adding a difference based on the content of the data block BD(k−1) right before. In this case, needless to say, it is important to secure that there is no data destruction or data garbling in the data block right before. At the same time, however, it may not be a problem even when there is destruction or data garbling in the data blocks B (1 to k−2) that are two or more blocks before.

In such a case, collation of the hash values needs to be performed only for one data block, so that it may not be considered as a problem even if the sensor-side heterogeneous chip C2 does not have a high calculation capability. Meanwhile, when destruction or data garbling is detected in the data right before, the authenticity of the data may be recovered by using the blockchain technology. Specifically, for all of the distributed and shared blockchains, the hash value of the data block B(k−1) right before is generated and collated to find the data block having no data destruction or data garbling, and the data block whose data is being destroyed is overwritten based thereupon.

In the embodiment described above of the sensor system of FIG. 4, it is preferable to employ the data structure illustrated in FIG. 5.

Furthermore, for example, while the data block generation unit 32g is described to generate the data of current transmission target as the data block BDk in the embodiments described above, it is not limited thereto. That is, the data block generation unit 32g may generate the data block BDk at an arbitrary timing. Specifically, for example, the data block generation unit 32g may generate the data block BDk at the timing where the data acquired by the sensor monitoring unit 31g is acquired or may generate the data block BDk for every prescribed time. Thereby, the data block generation unit 32g can generate the data block BDk at an arbitrary timing, so that the load of the CPU 11g can be lightened. This is the same for the data block generation unit 32m.

Furthermore, the system configuration and the hardware configuration illustrated in FIG. 1 and FIG. 4 are simply presented as examples for achieving the object of the present invention, and the configurations thereof are not limited thereto.

Furthermore, the data structure illustrated in FIG. 5 is simply presented as an example for achieving the object of the present invention, and the structure thereof is not limited thereto.

Furthermore, the functional block diagram illustrated in FIG. 6 is simply presented as an example, and functional configurations are not limited thereto. That is, it is sufficient for the system as a whole to include the functions capable of executing a series of processing described above, and what kind of functional blocks are to be used for achieving the functions is not limited to the example illustrated in FIG. 6.

Furthermore, the set places of the functional blocks are not limited to those illustrated in FIG. 6 but may be determined arbitrarily. Furthermore, a single functional block may be configured with hardware alone, may be configured with software alone, or may be configured with a combination of those.

When the processing of each of the functional blocks is executed by software, the program configuring the software is installed on a computer or the like from a network or a recording medium. The computer may be a computer mounted into dedicated hardware. Furthermore, the computer may be a computer that can execute various kinds of functions by installing various kinds of programs, such as a server as well as a multipurpose smartphone or a personal computer, for example.

A recording medium including such a program is not only configured with a removable medium, not illustrated, which is distributed separately from the device main body for providing the program to the user, but also configured with a recording medium or the like that is provided to the user while being mounted to the device main body in advance. The removable medium may be configured with a magnetic disk (including a floppy disk) an optical disk, a magneto-optical disk, or the like, for example. The optical disk may be configured with a CD-ROM (Compact Disk-Read Only Memory), a DVD (Digital Versatile Disk), or the like, for example. The magneto-optical disk may be configured with an MD (Mini-Disk), or the like. Furthermore, the recording medium that is provided to the user while being mounted into the device main body in advance may be configured with a ROM, not illustrated, to which the program is recorded, a hard disk included in the storage unit 22 of FIG. 6 or the like, for example.

In the current specification, the steps for writing the program recorded in the recording medium include not only the processing executed in time series along the order thereof but also the processing that is not necessarily executed in time series but executed in parallel or individually. Furthermore, in the current specification, the term "system" means a comprehensive device configured with a plurality of devices, a plurality of units, and the like.

In summary, an electronic device to which the present invention is applied may be sufficient to have a following configuration, and can take various kinds of modes of embodiments.

That is, the electronic device (for example, the blockchain chip C of FIG. 1 and the like) includes:

a generation unit (for example, the data block generation unit 32g of FIG. 6) that generates data in a prescribed unit based on prescribed information (sensor information or the like);

a first processing unit (for example, the first processing unit 33g of FIG. 6) that generates, with data of the unit as a processing target generated by the generation unit being first unit data (for example, the data block BD2 of FIG. 5) and data of the unit generated prior to the first unit data by the generation unit being second unit data (for example, the data block BD1 of FIG. 5), information including at least a hash value acquired from the second unit data as first association information (for example, the first association information HD2 of FIG. 5), and appends the first association information to the first unit data (for example, the data block BD2 of FIG. 5) as the processing target;

a second processing unit (for example, the second processing unit 34g of FIG. 6) that generates information including at least a hash value acquired from the first unit data (for example, the data block BD2 of FIG. 5) as second association information (for example, the second association information FT2 of FIG. 5), and appends the second association information to the first unit data (for example, the data block BD2 of FIG. 5) as the processing target; and a storage control unit (for example, the storage control unit 36g of FIG. 6) that executes control for correlating the first unit data (for example, the data block BD2 of FIG. 5) as the processing target, to which the first association information (for example, the first association information HD2 of FIG. 5) and the second association information (for example, the second association information FT2) are appended, with one or more other pieces of data of the unit (for example, the data block BD3 of FIG. 5) including the second unit data (for example, the data block BD1 of FIG. 5) by using a blockchain technology, and for storing the correlation in a prescribed storage medium (for example, the storage unit 12g of FIG. 6).

Thereby, destruction of the recorded data and data garbling can be detected by each of the units of the system in a distributed manner, so that it is possible to provide a technology capable of further reducing the risk of data destruction during data transmission. That is, with the heterogeneous chip using the blockchain technology, it is possible to distribute and share the data with the whole central heterogeneous chip or the like including the control CPU and one or more sensor-side heterogeneous chips. This can be strong protection means for promptly detecting data destruction and data garbling caused by an electrostatic discharge phenomenon and the like, which makes it possible to greatly reduce the load of the control CPU.

Furthermore, it is possible to include a transmission control unit (for example, the transmission control unit 37g of FIG. 3) that executes control for transmitting the first unit data (for example, the data block BD2 of FIG. 2) to which the first association information (for example, the first association information FD2 of FIG. 2) and the second association information (for example, the second association information FT2 of FIG. 2) are appended to another electronic device.

This makes it possible to share the data between the electronic devices.

Furthermore, it is possible to further include: an acquisition unit (for example, the communication unit 14 of FIG. 1) that acquires, from outside, a program (for example, the blockchain main body) that causes the first processing unit, the second processing unit, and the storage control unit to function; and a storage unit (for example, the nonvolatile memory (cache memory) 121 of FIG. 1) that stores the program (for example, the blockchain main body) acquired from the outside.

Thereby, it is possible to load the blockchain main body of the latest version at all times.

Moreover, it is also possible to further include a power acquisition unit (for example, the power acquisition unit 17 of FIG. 1) that acquires the power for driving the electronic device itself.

Thereby, the electronic device can be driven by itself.

Furthermore, an information processing system to which the present invention is applied includes a plurality of the electronic devices described above.

Thereby, the information processing system configured with a plurality of electronic devices can be applied to various scenes.

Furthermore, each of the plurality of electronic devices can transmit the data related to the operation of the vehicle to the other electronic devices.

Thereby, the information processing system configured with a plurality of electronic devices can be applied to control of the operations of an automobile, for example.

Furthermore, each of the plurality of electronic devices can transmit data of captured images to the other electronic devices.

Thereby, the information processing system configured with a plurality of electronic devices can be applied to control of a plurality of monitoring cameras, for example.

EXPLANATION OF REFERENCE NUMERALS

C Blockchain chip,
C1 Central heterogeneous chip,
C2-1 to C2-$n$ Sensor-side heterogeneous chip,
N Network,
M Automobile,
U1 to Un Heterogeneous Sensor unit,
11 CPU,
12 Storage unit,
13 Reset button,
14 Communication unit,
15 Indicator,
16 Identifier,
17 Power acquisition unit,
21 CPU,
22 Storage unit,
31 Sensor monitoring unit,
32 Data block generation unit,
33 First processing unit,
34 Second processing unit,
35 Confirmation unit,
36 Storage control unit,
37 Transmission control unit,
38 Reception control unit,
61 Reception control unit,
62 Data monitoring unit,
63 Storage control unit,
64 Transmission control unit,
71 HUB,
121 Nonvolatile memory (cache memory),
100 Wired LAN,
122 Volatile memory (RAM),
141 LAN terminal,
142 Input/output (I/O) port,
143 Bluetooth (registered trademark) antenna,
200 Wireless LAN,
300 Cloud server It is claimed:

1. An electronic device for distributed management of data comprising:
a processor coupled to a storage unit, having instructions stored thereon, which, when executed by the processor, cause the electronic device to perform operations comprising:
  determining whether there is an anomaly in operation of at least one sensor of a plurality of sensors and output sensor data according to the presence or absence of the anomaly, as a sensor monitoring processing;
  generating data for each transmission unit based on the sensor data, wherein the data includes a first transmission block and a second transmission block, consecutive in time series and each includes data for the transmission unit to be processed;
  generating as first association information, information including at least a hash value acquired from the data of the transmission unit included in the first transmission block, and adding the first association information to the data of the transmission unit included in the second transmission block, as a first processing;

generating as second association information, information including at least a hash value acquired from the data of the transmission unit included in the second transmission block that has been processed by the first processing unit, and adding the second association information to the data of the transmission unit included in the second transmission block, as a second processing;

checking whether the first association information included in the second transmission block and information of the hash value acquired from the data of the transmission unit included in the first transmission block have the same content, as a confirmation processing;

correlating the transmission blocks with each other using the correlation between the first transmission block and the second transmission block, and storing each of the transmission blocks in a storage medium in a state which the contents from the confirmation processing can be detected, as a storage control processing.

2. The electronic device according to claim 1, wherein the operations further comprise: executing control for transmitting each of the transmission blocks having a correlation between the first transmission block and the second transmission block, which have been checked by the confirmation processing, to another electronic device.

3. The electronic device according to claim 1, wherein the operations further comprise:
acquiring, from outside, a program to cause the first processing, the second processing, and the storage control processing to function, wherein the program is stored via the storage control processing.

4. The electronic device according to claim 1, wherein the operations further comprise: acquiring power for driving the electronic device.

5. An information processing system comprising a plurality of the electronic devices according to claim 2.

6. The information processing system according to claim 5, wherein each of a plurality of the electronic devices transmits data related to an operation of a vehicle to another of the electronic devices.

7. The information processing system according to claim 5, wherein each of a plurality of the electronic devices transmits data of a captured image to another of the electronic devices.

8. The electronic device according to claim 3, further including a reset button for resetting a functional configuration loaded by the program to an initial state or for upgrading version.

9. The electronic device according to claim 1, wherein the sensor data includes a plurality of sensing data detected by various sensors.

10. The electronic device according to claim 9, wherein when the sensor monitoring processing determines the anomaly in an operation state of at least one of the various sensors, the sensor monitoring processing executes control to block a signal detected by the at least one of the various sensors.

* * * * *